(12) United States Patent
Archambault et al.

(10) Patent No.: US 8,996,648 B2
(45) Date of Patent: Mar. 31, 2015

(54) SOCIAL NETWORKING FEED EXTENSIBILITY BASED ON DATA TYPES

(75) Inventors: Anne Archambault, Redmond, WA (US); Cedric Dussud, Seattle, WA (US); Jeremy Santy, San Luis Obispo, CA (US); Ellen Steele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 12/958,218

(22) Filed: Dec. 1, 2010

(65) Prior Publication Data

US 2012/0143948 A1    Jun. 7, 2012

(51) Int. Cl.
| | |
|---|---|
| *G06F 15/16* | (2006.01) |
| *H04L 12/58* | (2006.01) |
| *G06F 17/27* | (2006.01) |
| *G06Q 10/06* | (2012.01) |
| *G06Q 50/00* | (2012.01) |
| *H04L 29/08* | (2006.01) |

(52) U.S. Cl.
CPC ............. *H04L 12/588* (2013.01); *H04L 51/32* (2013.01); *G06F 17/271* (2013.01); *G06Q 10/0631* (2013.01); *G06Q 50/01* (2013.01); *H04L 67/26* (2013.01)
USPC ............................ 709/217; 709/203; 709/219

(58) Field of Classification Search
USPC ......... 709/204, 206, 210, 231, 220, 203, 217, 709/219; 379/68
See application file for complete search history.

(56) References Cited

U.S. PATENT DOCUMENTS

| | | | |
|---|---|---|---|
| 6,035,119 A * | 3/2000 | Massena et al. ............... | 717/100 |
| 2004/0078431 A1* | 4/2004 | Ahn ............................... | 709/205 |
| 2006/0173985 A1 | 8/2006 | Moore | |
| 2007/0038923 A1 | 2/2007 | Patel | |
| 2007/0043766 A1* | 2/2007 | Nicholas et al. ........... | 707/104.1 |
| 2007/0094156 A1 | 4/2007 | Isaacs | |
| 2007/0106627 A1* | 5/2007 | Srivastava et al. .............. | 706/20 |
| 2007/0130164 A1 | 6/2007 | Kembel et al. | |

(Continued)

FOREIGN PATENT DOCUMENTS

| | | |
|---|---|---|
| CN | 1534924 A | 10/2004 |
| CN | 1912829 A | 2/2007 |

(Continued)

OTHER PUBLICATIONS

Tadlock, Justin., "Custom post types in WordPress", Retrieved at <<http://justintadlock.com/archives/2010/04/29/custom-post-types-in-wordpress>>, Apr. 29, 2010, pp. 77.

(Continued)

*Primary Examiner* — Phuoc Nguyen
(74) *Attorney, Agent, or Firm* — Jessica Meyers; Peter Taylor; Micky Minhas (57) ABSTRACT

Social networking feed extensibility based on data types is described. An apparatus may comprise a custom feed system that when executed by a processor is operative to customize a social networking feed for a social networking system. The custom feed system may comprise a message reception component operative to receive a message from a client device, a message analysis component operative to determine a message type of the message based on a syntax of the message, and a message display component operative to display the message with a message display style specific to the message type of the message. Other embodiments are described and claimed.

20 Claims, 6 Drawing Sheets

(56) References Cited

U.S. PATENT DOCUMENTS

| | | | | |
|---|---|---|---|---|
| 2008/0040673 | A1* | 2/2008 | Zuckerberg et al. | 715/745 |
| 2009/0031207 | A1* | 1/2009 | Molenaar | 715/224 |
| 2009/0327232 | A1* | 12/2009 | Carter et al. | 707/3 |
| 2010/0070448 | A1* | 3/2010 | Omoigui | 706/47 |
| 2010/0241579 | A1* | 9/2010 | Bassett et al. | 705/319 |
| 2011/0320543 | A1* | 12/2011 | Bendel et al. | 709/206 |
| 2012/0011015 | A1* | 1/2012 | Singh et al. | 705/26.1 |
| 2012/0185486 | A1* | 7/2012 | Voigt et al. | 707/741 |

FOREIGN PATENT DOCUMENTS

| | | |
|---|---|---|
| CN | 101681357 A | 3/2010 |
| EP | 1465394 A2 | 10/2004 |

OTHER PUBLICATIONS

Crowe, Paul., "Add a Feed Icon Beside Your Labels and Give Every Category It's Own Feed", Retrieved at <<http://www.spiceupyourblog.com/2010/02/feed-for-every-label-blogger-blog.html>>, Feb. 2, 2010, pp. 4.

Havenstein, Heather., "Microsoft testing prototype of Facebook-like social network", Retrieved at <<http://www.computerworld.com/s/article/9096318/Microsoft_testing_prototype_of_Facebook_like_social_network>>, Jun. 10, 2008, pp. 6.

Williams, Alex., "Microsoft Testing OffceTalk—Microblogging Service Much Like Twitter", Retrieved at <<http://www.readwriteweb.com/enterprise/2010/03/microsoft-developing-officetal.php>>, Mar. 24, 2010, pp. 4.

"Help for the Web-based Newsreader", Retrieved at <<http://www.microsoft.com/wn3/locales/help/help_en-us.htm>>, Retrieved Date: Aug. 16, 2010, pp. 22.

"Feed-buster", Retrieved at <<http://code.google.com/p/feed-buster/>>, Retrieved Date: Aug. 16, 2010, pp. 4.

"WordPress Plugins", Retrieved at <<http://webdevstudios.com/support/wordpress-plugins/>>, Retrieved Date: Aug. 16, 2010, pp. 7.

"Office Action and Search Report Issued in Chinese Patent Application No. 201110415327.1", Mailed Date: Dec. 4, 2013, 14 Pages.

"Office Action Issued in Chinese Patent Application No. 201110415327.1", Mailed Date: Apr. 1, 2014, 14 Pages.

"Office Action and Search Report Issued in Chinese Patent Application No. 201110415327.1", Mailed Date: Jul. 30, 2014, 18 Pages.

* cited by examiner

SOCIAL NETWORKING FEED EXTENSIBILITY BASED ON DATA TYPES

BACKGROUND

As computers and the Internet have continued to advance in sophistication, their use as a tool for social networking has increased. One such tool is aggregation services, such as social networking feeds, news feeds, message feeds, and so forth. For example, social networking feeds allow a user to see a list of posts, or short messages, written by others in their social network. This allows the user to stay current with events, activities and conversations of other members in their social network. As the use of social networking tools has grown more common, the desire to create more specialized social networking feeds has grown. For example, a business enterprise may desire a private social networking feed to promote communication within the business. However, as will become more evident, existing tools for creating and customizing social networking feeds are limited. It is with respect to these and other considerations that the present improvements have been needed.

SUMMARY

This Summary is provided to introduce concepts concerning managing a social networking feed which are further described below in the Detailed Description. This Summary is not intended to identify key features or essential features of the claimed subject matter, nor is it intended to be used as an aid in determining the scope of the claimed subject matter.

Various embodiments are generally directed to techniques for customizing a social networking feed for a social networking system. Some embodiments are particularly directed to customizing a social networking feed based on different types of data or posts to the social networking feed. In one embodiment, for example, a message may be received from a client by a server implementing a social networking system (SNS) having a social networking feed. The social networking system may analyze the message, and determine a message type for the message based on a given syntax of the message. The social networking system may display the message with a message display style specific to the message type of the message. Different message display styles may be selected from various predefined templates, or custom defined using a graphic user interface. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Social networking feeds have become an increasingly popular social networking tool to communicate within a social network. A social networking feed aggregates messages posted by various members within a given social network, and displays the aggregated message posts in a single user interface view. A user may quickly scan the single view to keep current with activities like changes in relationship status, events, and conversations with other users.

Social networking feeds, however, are still a nascent technology and significant improvements are needed. For instance, social networking feeds are generally a fairly homogeneous stream of data. All entries are formatted and presented in a uniform manner. As such, it may be difficult for a user to find a message post of interest to the user among the plethora of data. Existing tools for creating social networking feeds tend to limit the manner in which users may distinguish their posts from the posts of others, and extending or customizing the social networking feed may be difficult for users which do not possess programming skills.

To solve these and other problems, various embodiments are directed to enhanced feed customization techniques designed to enhance a social networking feed for a social networking system in a manner that quickly and easily allows users and system administrators to customize various aspects, properties, features or characteristics of a social networking feed. For instance, new message post types may be defined for a specific organization or entity. By way of example, a system administrator may define message post types for each product manufactured or sold by a business enterprise, research and development group for new products, business group (e.g., accounting, legal, operations, etc.), clubs, projects, and so forth. Further, targeted functionality and custom handling rules may be defined for each message post type. For instance, each post type may have a specific rendering or presentation format associated with it. By way of example, a particular message post type may have a custom icon, font, or other custom presentation or formatting parameters. In another example, certain message post types may be displayed for certain levels of defined relationships within a given social network, routed to specific social members, applications or devices using alternative messaging transports (e.g., email, chat, SMS, MMS, etc.), filtered by message post type, sorted by message post type, and so forth. In this manner, a social networking feed may be customized based on different types of data received by the social networking feed. Such customization options allows a viewer to more easily scan through the aggregated message posts from multiple social members presented by the social networking feed, and quickly hone in on message posts of interest. This also allows for rich filters and user interface views for different message post types. As a result, implementation of various enhanced feed customization techniques provides an enhanced social networking feed which provides an overall improved SNS experience.

In one embodiment, for example, a message may be received from a client by a server implementing a social networking system (SNS) providing a social networking feed for related social members within a group (e.g., friends). The social networking system may analyze the message, and determine a message type associated with the message based on a given syntax or format of content within the message. The social networking system may retrieve a message display style corresponding to the message type, and display the message in the social networking feed with the retrieved message display style specific to the message type of the message. Different message display styles may be selected from various predefined templates, or custom defined using a custom feed graphic user interface. In this manner, a social networking feed may be tailored and customized for a particular user, social network, organization, business enterprise, group, entity or other collection of related members.

Reference will now be made in detail to embodiments of the present technology for managing a social networking feed, examples of which are illustrated in the accompanying drawings. While the technology for managing a social networking feed will be described in conjunction with various embodiments, it will be understood that they are not intended to limit the present technology for managing a social networking feed to these embodiments. On the contrary, the presented technology for managing a social networking feed is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for managing a social networking feed. However, the present technology for managing a social networking feed may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "determining", "displaying", "specifying", "defining", "representing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for managing a social networking feed is also well suited to the use of other computer systems such as, for example, optical and mechanical computers. Additionally, it should be understood that in embodiments of the present technology for managing a social networking feed, one or more operations can be performed manually.

Figure 1:
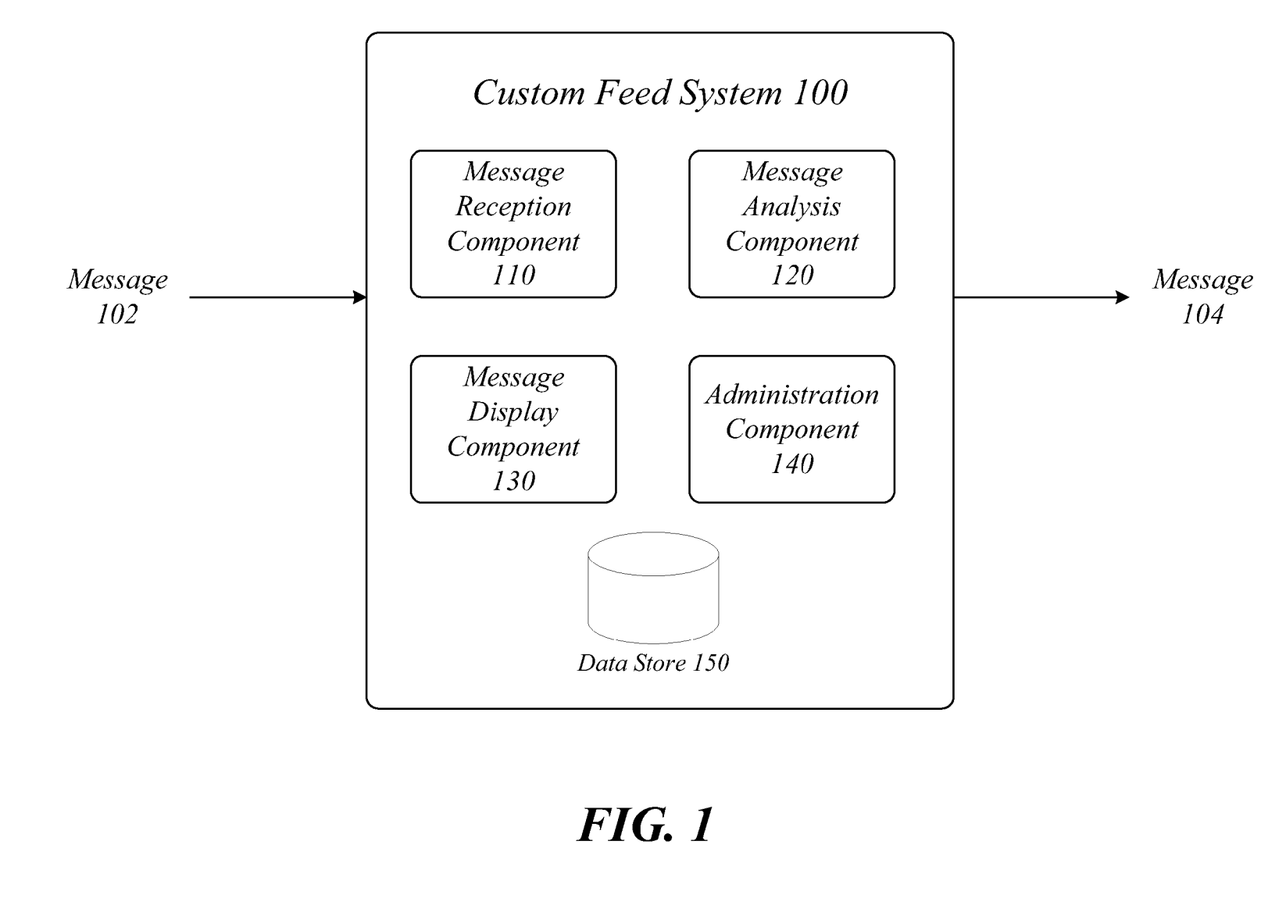
FIG. 1 depicts an exemplary block diagram of a system for managing a social networking feed, according to one embodiment of the present technology.

FIG. 1 depicts a block diagram of a custom feed system 100 designed for managing a social networking feed, such as for a public or private social networking system (SNS), for example. In the illustrated embodiment shown in FIG. 1, the custom feed system 100 includes a message reception component 110, a message analysis component 120, a message display component 130, an administration component 140, and a data store 150. The message reception component 110 is generally operative to receive a message from a client. The message analysis component 120 is generally operative to determine a message type of the message based on a syntax of the message. The message display component 130 is generally operative to display the message with a message display style specific to the message type of the message. The administration component 140 is generally operative to allow a user to perform administrative operations to control operation of the custom feed custom feed system 100, such as specifying rules for the message analysis component 120 and the message display component 130, among others. It may be appreciated that these or other elements in various topologies may be implemented for a given set of design parameters and performance constraints. The embodiments are not limited in this context.

In various embodiments, the message reception component 110 may be arranged with various message interfaces capable of receiving a message 102 from various applications or devices. Each message interface may correspond to a given message application, communications protocol, or communications media. The message 102 may originate from a same device implementing the custom feed system 100, or a different device from a device implementing the custom feed system 100. In one embodiment, for example, the custom feed system 100 may be implemented by a server or server array hosting a SNS web service. The message 102 may be received by the server or server array from a client device implementing various message applications, such as an email application, a chat application, a short message service (SMS) application, a multimedia message service (MMS) application, a unified messaging application, a facsimile application, a phone application, a voicemail application, and so forth. The server and client device may communicate over a wired network, a wireless network, or a combination of both. The embodiments are not limited in this context.

In various embodiments, the message analysis component 120 may be arranged to determine a message type of the message 102 based on a given syntax of the message. In various embodiments, the syntax of all message types might comprise a keyword or punctuation symbol. A specified syntax may comprise a keyword or punctuation symbol that represents the message type. By way of example, a syntax for questions might specify that the keyword "Question" will appear in all messages that are posed questions, or that a "?" punctuation symbol is embedded somewhere within the message. In another example, a syntax for emphasized statements might specify that a keyword "Declaration" will appear in all messages that are posed as strong statements, or that a "!" punctuation symbol is embedded somewhere within the message. In various embodiments, the syntax of all message types might comprise a keyword or punctuation symbol that appears at the start or end of a message. A specified syntax might specify a position of a keyword in a message. For example, the syntax for questions might specify that the keyword "Question" or "Declaration" will appear at the beginning or start of the message, or that a punctuation symbol "?" or "!" will appear at the end of the message. Other syntax rules may be implemented, and the embodiments are not limited to these examples.

In some cases, a specified syntax may be defined having a unique characteristic that allows a higher confidence level that a message 102 is of a given message type. For instance, scanning for only the word "Question" in a text of a message 102 may lead to inconsistent message type identification. For instance, a message 102 may have text such as "An interesting question would be whether we should enter this new feature into our product." The presence of the word "question" by itself would cause the message analysis component 120 to identify the message 102 as a question message type. However, the context may indicate that this is a statement and not a question, thereby leading to an incorrect identification of message type. Similarly, scanning for a punctuation symbol by itself may lead to incorrect message type identification. For instance, a message 102 may have text such as "Who would have thought?" which is more a figure of speech than an actual question. As such, the message analysis component 120 may utilize a syntax rule where a key word or punctuation symbol needs to be unique, such as adding a colon after the word "question." When the message analysis component 120 detects "Question:" it may lead to a more accurate determination of message type for a message 102. Similarly, a syntax rule may require punctuation symbols in specific positions in a message 102, such as at a beginning and end of a sentence, or that multiple punctuation symbols are used in sequence, such as "??" as a trigger. These are merely a few examples, and any number of custom syntax rules may be developed for a specific implementation. The embodiments are not limited in this context.

Additionally or alternatively, the message analysis component 120 may also determine a message type of the message 102 based on an additional piece of metadata embedded in the message 102 or attached to the message 102. The additional metadata may be removed, made invisible, or otherwise rendered undetectable when the modified message 102 (e.g., message 104) is posted on a social networking feed accessible by social members.

In various embodiments, the message display component 130 may be arranged to present, render or display the message 102 according to a message display style associated with a message type of the message 102 as determined by the message analysis component 120. A message display style may define various presentation or formatting parameters for a given message type of the message 102. For example, a message display style may define a custom logo or icon, font, font size, font color, background color, predefined text (e.g., custom words inserted before a message post or appended after a message post), animations, video, multimedia effects, and other custom presentation or formatting parameters. For instance, a message display style might specify a particular image for display at the beginning of a message post that allows for the easy visual identification of messages of different message types. For example, a message display style for questions might specify an image or icon that is representative of questions, to allow for the easy visual identification of which messages are questions within a social networking feed.

In various embodiments, a message display style might further specify a command for display with the message, so that the experience of a user viewing the message may be enhanced by providing a command that is appropriate for, or particular to, messages of that message type. These commands may comprise a link or other means of initiating an action, and may have an associated name for display to identify the command. A link might direct a user to a page containing more messages of the same type or to any other page appropriate to the message type. For example, a message display style for questions might specify a command for reading more questions, which, when selected, opens a page showing more questions. In various embodiments, multiple commands may be specified for a message display style, the multiple commands all displayed with the message. For example, a message display style for questions might additionally or alternatively specify a command for replying to questions, which, when selected, opens a form or dialog for replying to the question. In another example, the additional commands could be attached to the posted message or to a reply to the parent post. Different commands might appear for each. For instance, for a question, a command might be to see more related questions. For a reply to a question, a command might be to vote for the best answer to help identify the best responses. The embodiments are not limited in this context.

The message display component 130 may retrieve a message display style associated with the message type of the message 102 from the data store 150, format the message 102 in accordance with the associated message display style, and generate the message 104. The message 104 may then be posted on a social networking feed accessible by social members via a web browser, or sent directly to a device for display by a user device (e.g., a smart phone).

In various embodiments, there may also be an optional administration component 140. The administration component 140 is operative to define custom message types and custom message display styles. The administration component 140 may generate custom user interface views to facilitate definition of custom message types and custom message display styles, as described in more detail with reference to FIG. 4. It should be appreciated that any configuration options available to message types may be available to custom message types. In various embodiments, custom message types may be associated with a custom syntax, which may specify a custom keyword that represents the custom message type. In various embodiments, the custom message display style may specify a custom image and a custom command for the custom message type. Custom message type definitions and custom message display styles may be associated with a given message type, and stored in the data store 150.

Figure 2:
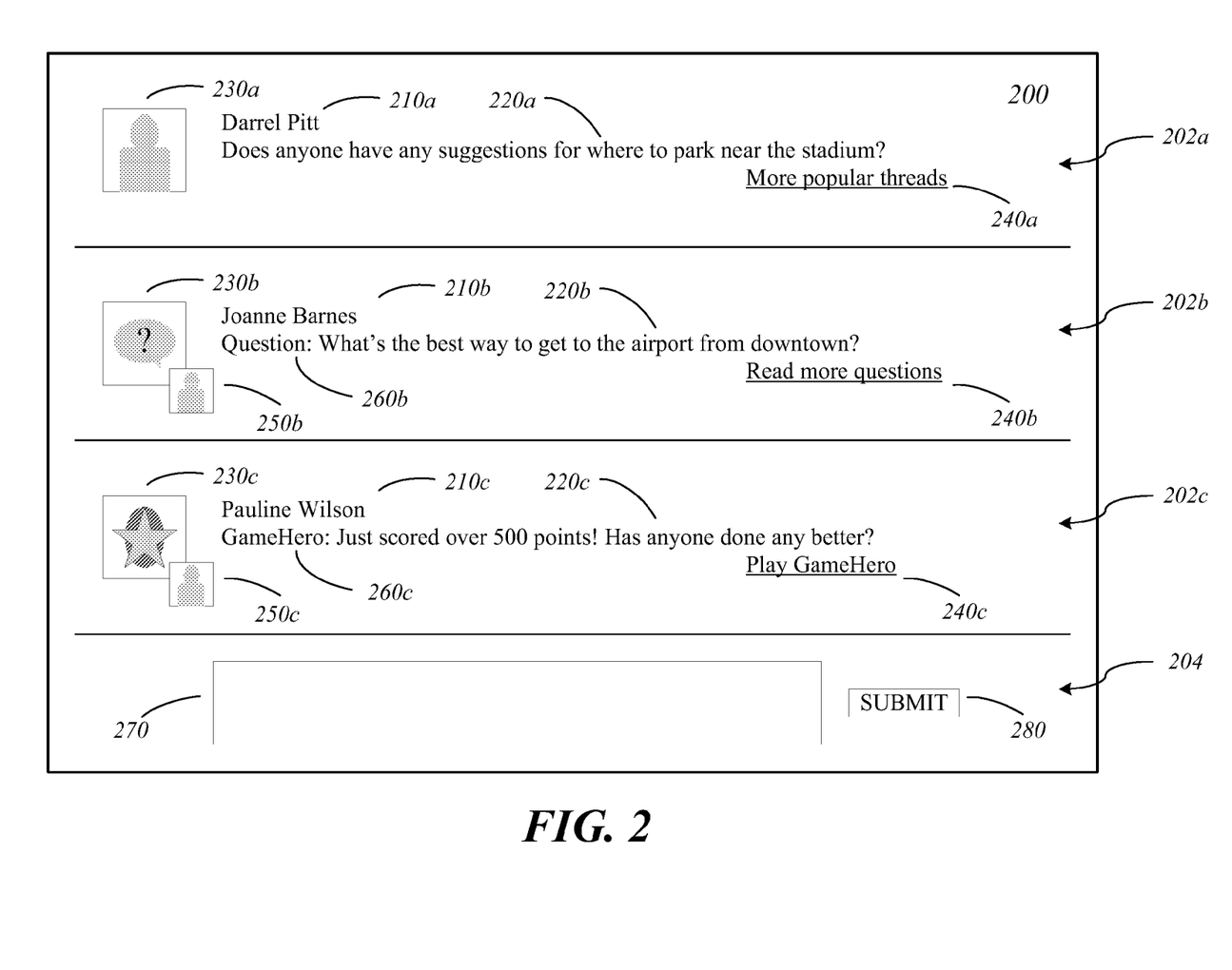
FIG. 2 depicts an exemplary diagram of a web page containing a sequence of messages in a blog format, according to one embodiment of the present technology.

FIG. 2 depicts an exemplary diagram of a social networking feed 200 containing a sequence of messages 202 in a blog format or other aggregation format, each message 202 displayed as a post on a blog. For example, each message 202 may be an embodiment of the message 104. In one embodiment, for example, the social networking feed 200 may be accessed as a web page via a web browser. In one embodiment, for example, the social networking feed 200 may be accessed as a graphical user interface as presented by an application on a mobile device.

As illustrated in FIG. 2, the social networking feed 200 displays a series of messages 202. The first message 202a identifies a client (or user) 210a, who generated message content 220a which was transmitted to the message reception component 110 from a client device. The message 202a may further include an image 230a, which may be a graphic or picture representing the client 210a. The message 202a may also be displayed with a command 240a, which may comprise a link or other means of initiating an action. It may be appreciated that the messages 202 may include any number of artifacts (e.g., picture, link, document, etc. . . . ). In addition, a user may also be further defined by a picture, contact card, presence information, profile, and so forth. The embodiments are not limited in this context.

In various embodiments, there may be a default message type of a message 202, which may specify a specific visual rendering that may include an image or further visual attributes (e.g., font, colors, size, layout, etc. . . . ) such as a default image and a default command. In various embodiments, the default message type may be used if the syntax of a received message 102 does not match any other message type. In various embodiments, the default image may be specific to the client that transmitted the message, such as by using a profile picture or other image representing the client.

The second message 202b is one example of a message using a message type associated with a question. In this example, the message 202b includes message content 220b having a keyword 260b "Question:" positioned at a beginning of the message content 220b. The message analysis component 120 may determine that a message 102 with the text "Question" at the beginning is of a message of the question message type. The message display component 130 may display the message 220b with a message display style specific to the question message type. In this example, the message display style includes the image 230b, an image associated with the question message type, which is displayed for messages of that type. Additionally or alternatively, the image 230b may be displayed in association with the image 250b, which may be an icon or picture representing the client (or user) 210b "Joanne Barnes." In this example, the message display style also includes the command 240b, a command associated with the question message type, which is displayed for messages of that type. In this instance, the command 240b is a link to a page showing more questions, but it should be appreciated that other commands may be associated with questions, such as, at least, a command to reply to the message or to see replies to the message. In various embodiments, multiple commands may be specified for a message display style, and multiple commands may also be specified for message replies as well.

In various embodiments, a message 220 may also be of a custom message type associated with a custom message display style. Users or administrators of the social networking feed 200 may desire to highlight, promote, or otherwise distinguish certain types of messages 220 that do not already have specific message types associated with them. For example, some of the users of the social networking feed 200 may play a game called "GameHero" and wish to have a specific message type with a specific message display style associated with messages related to that game. A user or administrator may use the administrative component 140 to define a custom message type and all details associated with the custom message type and/or any reply messages.

Message 202c in FIG. 2 illustrates an example of such a message. The custom message type may be associated with a custom keyword that represents the custom message type. In this example, message content 220c may include a custom keyword 260c as the word "GameHero:." The custom message type may be associated with a custom message display style that specifies a custom image for display with the message. In this example, the message display style includes the image 230c, an image associated with the GameHero message type, which is displayed for messages of that type. The image 230c may be displayed in association with the image 250c, which may be an icon or picture representing the client (or user) 210c. In this example, the custom message display style also includes the custom command 240c, a command associated with the GameHero message type, which is displayed for messages of that type. In this example, the custom command 240c is a command to play the GameHero game, but it should be appreciate that other custom commands may be associated with a custom message type.

FIG. 2 further depicts a user interface element 240 with a message entry area 270 and a button 280. The message entry area 270 may allow for the entry of a message by a user, such as by typing the message into a text field and submitting the message, such as by selecting the button 280. It should be appreciated that in the case of a web page, a client may be identified through the use of a persistent log-in or through the use of a field which allows the specification of the identify of a client.

It is worthy to note that the social networking feed 200 as shown in FIG. 2 may include further elements and examples as well. For instance, the social network feed 200 may include a user interface element or command to allow replies to a message 202. Much like a message 202, a message reply to a message 202 may be subject to analysis using a same or different set of message analysis rules and/or message display styles as used for the message 202. For example, message analysis rules and/or message display styles may specify a specific visual rendering that may include an image or further visual attributes (e.g., font, colors, size, layout, etc. . . . ) such as a default image and a default command may be used for any reply messages associated with a given message 202.

It should be appreciated that the use of keywords as one method of specifying a syntax may provide a distinct advantage, as it should be appreciated that method of transmitting a message from a user or client to the system other than a web page are envisioned. It should be appreciated that as the use of the syntax of the message to determine a message type allows for complex display attributes to be derived from a message written in plain text, which may be advantageous for forms of communication that are entirely text-based. For example, the system may allow for a client to submit a message through an instant message, text message, e-mail, or other form of communication that may contain a message. Additionally or alternatively, implementing an extensible schema that supports message type identification information in one or more invisible message fields, whether added manually by a client or automatically by an application or service, also provides an advantage of a more precise identification of message type. This may entail a design trade-off of such factors as user convenience, system complexity and system accuracy.

The system may use identity information associated with the message to identify the client in question and thereby attribute the message to the client through identifiers on a web page such as 230a, 230b, and 230c. In the example of an instant message, identity information might comprise the identity associated with the instant message, such as a user account for the instant message. In the example of a text message, identity information might comprise the phone number associated with the text message, which might be associated with a user of the social networking feed. In the example of an e-mail, identity information might comprise the e-mail address associated with the e-mail, which might be associated with a user of the social networking feed.

Figure 3:
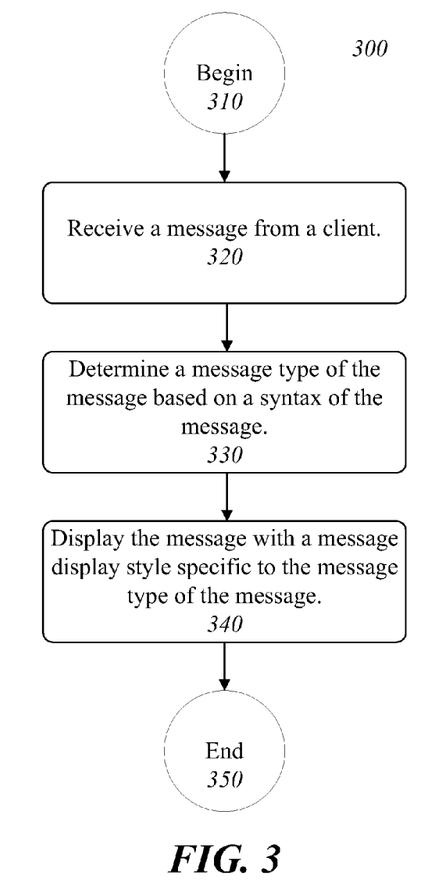
FIG. 3 depicts an exemplary flowchart for a method of managing a social networking feed, according to one embodiment of the present technology.

FIG. 3 depicts a logic flow 300 suitable for managing a social networking feed, such as the social networking feed 200, for example. Although specific operations are disclosed in logic flow 300, such operations are exemplary. That is, various embodiments of the present technology are well suited to performing various other operations or variations of the operations recited in logic flow 300. It is appreciated that the operations in logic flow 300 may be performed in an order different than presented, and that not all of the operations in logic flow 300 may be performed.

The operations recited in logic flow 300 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 300 may be embodied as such instructions, such operations are exemplary. That is, the instructions may be well suited to performing various other operations or variations of the operations recited in logic flow 300. It is appreciated that instructions embodying the operations in logic flow 300 may be performed in an order different than presented, and that not all of the operations in logic flow 300 may be performed.

In operation 310, the method begins.

In operation 320, a message is received from a client. For example, assume for the purposes of illustration that the message 102 is received by an appropriate message interface of the message reception component 110 of the custom feed system 100 from a client device for display on a web page generated by a SNS server. Message 220b is an example of a message that might be received from a client device.

In operation 330, a message type of the message is determined based on a syntax of the message. For example, the message analysis component 120 may receive the message 102, and analyze a syntax for the message 102 to determine its message type. In various embodiments, the syntax of the message may comprise a keyword that represents the message type. In various embodiments, the syntax might specify the position of the keyword in the message, such as that the keyword will appear at the beginning or start of the message. In the continuing example, the syntax of message 220b is analyzed and the keyword 260b, "Question", is recognized as a keyword associated with the question message type.

In operation 340, the message is displayed with a message display style specific to the message type of the message. For example, the message display component 130 may receive a message type for the message 102 from the message analysis component 120, and use the message type to search the data store 150 for a message display style associated with the message type. In various embodiments, the message display style may specify an image and a command. In the continuing example, the message display style specific to the question message type includes the image 230b and the command 240b. As such, in this example, image 230b and command 240b are displayed on the web page with the message.

In operation 350, the method stops.

Figure 4:
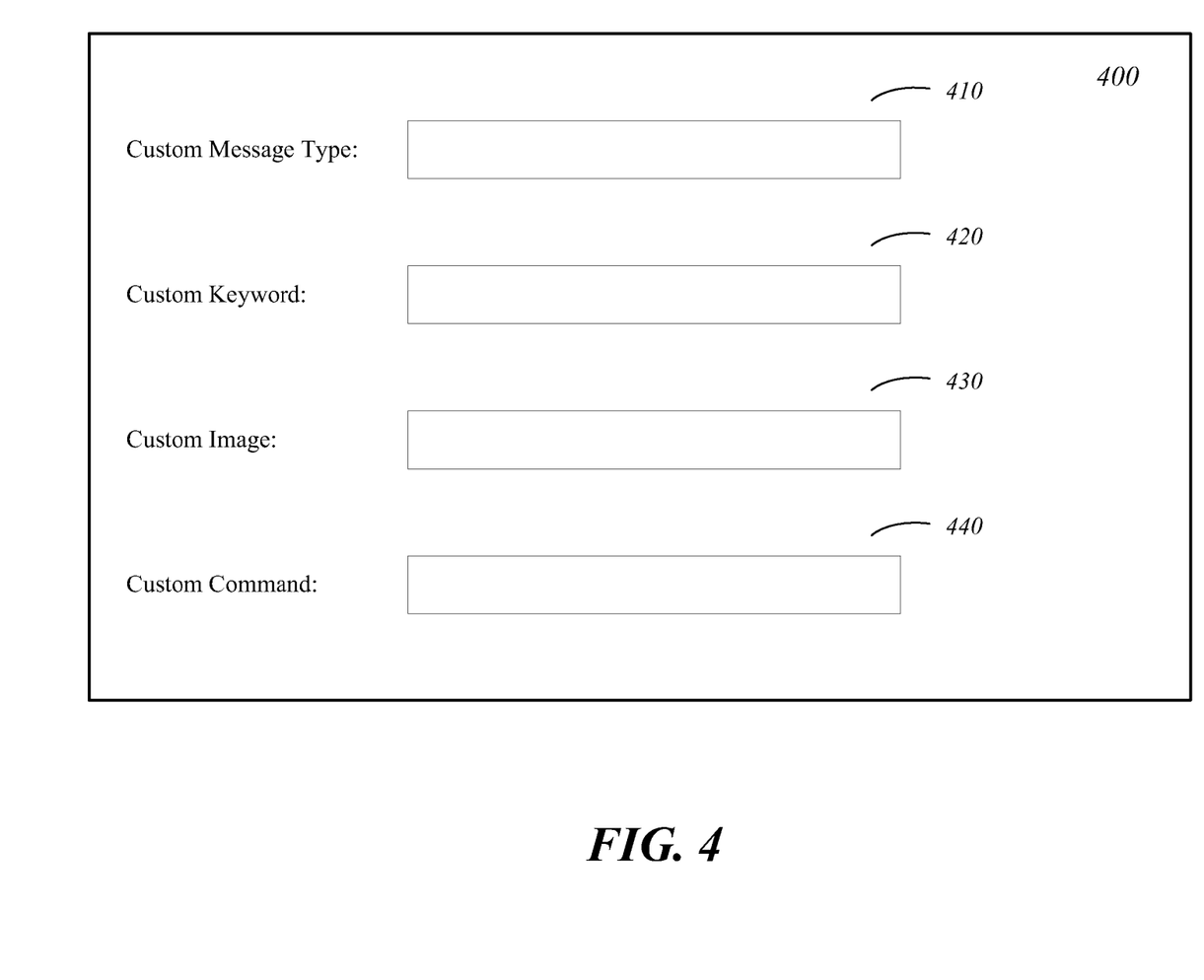
FIG. 4 depicts an exemplary diagram of a web page containing an administration page, according to one embodiment of the present technology.

FIG. 4 depicts an exemplary diagram of an administration page 400, according to one embodiment of the present technology. The administration page 400 may be generated as a web page by a web browser, or a user interface view for an application implemented by a mobile device. In various embodiments, the administration page 400 may be operative to allow administration of the social networking feed 200. In various embodiments, for example, the administration page 400 may be operative to allow the creation, modification, and deletion of message types and message display styles, including custom message types and custom message display styles.

As illustrated in FIG. 4, the administration page 400 may contain a number of fields allowing for the administration of the social networking feed 200. For example, a user may wish to create a custom message type with a custom image, a custom command, and a custom syntax comprising a custom keyword. As pictured, the user may enter a name for the custom message type in field 410, enter a custom keyword in field 420, enter a custom image in field 430, and enter a custom command in field 440. It should be appreciated that the fields, as pictured, may represent a text entry field or more complex data entry structures that may, for example, be composed of multiple text entry fields or may cause the instantiation of a dialogue with the user for specifying data, such as through a file system dialog box.

Returning to an earlier example, a user wishing to create a "GameHero" custom message type might enter the text "GameHero" into field 410, specifying a name for the custom message type.

Continuing the example, the user may enter the text "GameHero" in field 420, specifying that the text "GameHero:" is the custom keyword associated with the GameHero message type. It should be appreciated the field 420 may be operative to allow for the entry of more complex syntaxes for identifying message types, such as through the use of regular expressions, and may comprise multiple entry fields which may be used to specify multiple keywords each of which may be associated with the custom message type.

Continuing the example, the user may specify an image in field 430, such as custom image 230c of FIG. 2, for use as the custom image for the custom display style associated with the GameHero message type. It will be appreciated that field 430 may be operative to allow for the entry of an image in a variety of manners, including, at least, specifying the URL of an image, specifying the location of a file containing the image, or by selecting one of a number of pre-prepared images that may be assigned to custom message types. Further, a user may specify more complex visual rendering rules than a simple image, such as specific characteristics of an image, multiple images, animations, image style, colors and other visual cues.

Continuing the example, the user may specify a command in field 440, such as custom command 240c of FIG. 2, for use as the custom command for the custom display style associated with the GameHero message type. It will be appreciated that the field 440 may be operative to allow for the entry of commands in a variety of manners, including, at least, specifying a URL and display text for the command. Field 440 may comprise a plurality of fields allowing for the specification of multiple commands (e.g., on a message post and/or a message reply)

In some cases, after the specification of a custom message type, the custom feed system 100 may be operative to allow for the testing of the custom message type, such as by displaying an example message using the specifications for the custom message type. In various embodiments, the example may be functional, allowing for the testing of the custom command. In various embodiments, after testing, or without testing, the system may be operative to store the custom message type and its associated data for later use.

It should be appreciated that the use of an administration page allows for the specification of custom message types, custom keywords, custom display styles, custom images, and custom commands without the use of programming or coding, and without requiring use of or knowledge of a programming API. This may allow for the creation of custom message types by a larger spectrum of users and administrators. Alternatively, for those users and administrators capable of programming, a programming platform may be implemented with the custom feed system 100 to allow more complex behaviors, features, and services.

Figure 5:
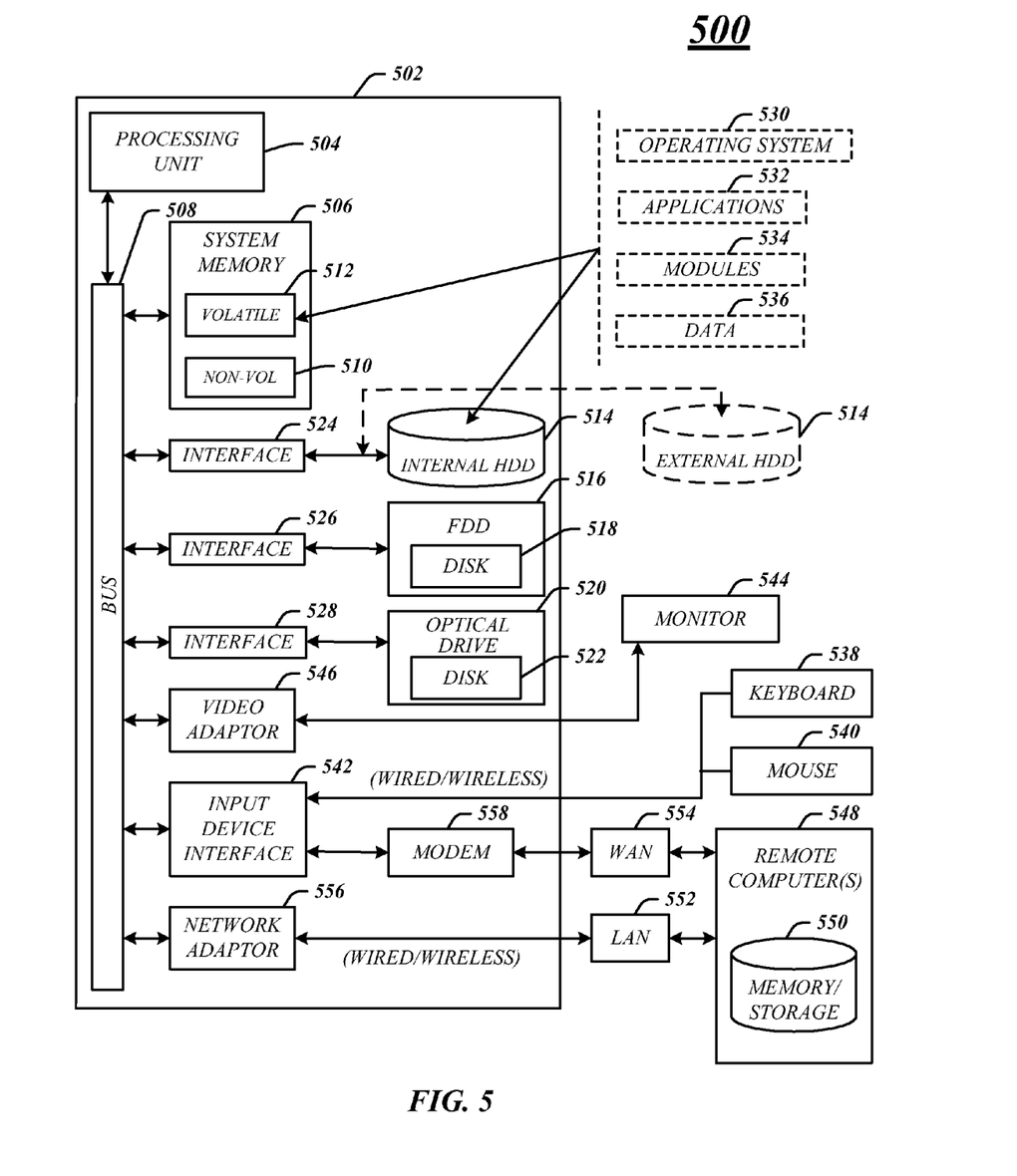
FIG. 5 depicts an exemplary diagram of a computing system according to one embodiment of the present technology.

FIG. 5 illustrates an embodiment of an exemplary computing architecture 500 suitable for implementing various embodiments as previously described. The computing architecture 500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors. Dual microprocessors and other multi-processor architectures may also be employed as the processing unit 504. The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures.

The system memory 506 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media, including an internal hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. The one or more application programs 532, other program modules 534, and program data 536 can include, for example, the custom feed system 100, the message reception component 110, the message analysis component 120, the message display component 130, and the administration component 140.

A user can enter commands and information into the computer 502 through one or more wire/wireless input devices, for example, a keyboard 538 and a pointing device, such as a mouse 540. Other input devices may include a microphone, an infra-red (IR) remote control, a joystick, a game pad, a stylus pen, touch screen, or the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
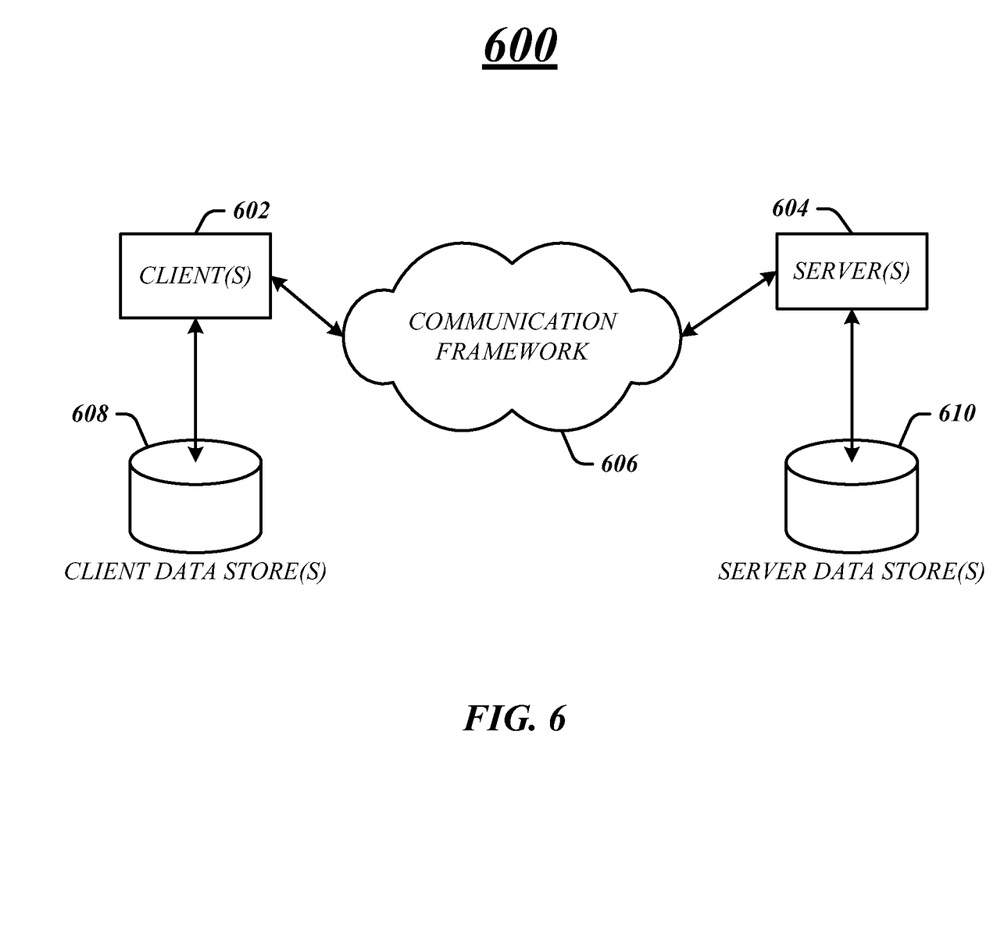
FIG. 6 depicts an exemplary diagram of a communications system according to one embodiment of the present technology.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, and so forth. The embodiments, however, are not limited to implementation by the communications architecture 600.

As shown in FIG. 6, the communications architecture 600 comprises includes one or more clients 602 and servers 604. The clients 602 may host the clients of the present technology, and may be used to transmit the messages of the present technology. The servers 604 may implement the custom feed system 100. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 602 and the servers 604 may include various types of standard communication elements designed to be interoperable with the communications framework 606, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 602 and a server 604 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a computer-readable storage medium arranged to store logic. Examples of a computer-readable storage media include any storage medium capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

For example, while the subject matter has been described in reference to a social networking feed, it is to be understood that other applications are envisioned. Any type of message display which might benefit from determining a message type by a syntax and displaying the message in a message display style specified for that message type. For example, an e-mail, instant message, text message, or other form of electronic communication might contain a keyword "Question" that is associated with a message type and display style for questions. The program or device displaying the e-mail, instant message, text message, or other might then display the message in the display style specific to questions.

The invention claimed is:

1. An apparatus, comprising:
   a processor;
   a custom feed system executing on the processor to customize a social networking feed for a social networking system, the custom feed system comprising:
   a message reception component operative to receive a message from a client device;
   a message analysis component operative to determine a message type of the message based on a syntax of the message, wherein the message type is associated with a specific message display style comprising at least one of a presentation parameter and formatting parameter, the syntax of the message comprising a custom syntax for the message type; and
   a message display component operative to display the message according to the message display style associated with the message type of the message.

2. The system of claim 1, the syntax of the message comprising a keyword that represents the message type.

3. The system of claim 1, the message display style to specify an image.

4. The system of claim 1, the message display style to specify a command.

5. The system of claim 1, comprising an administration component operative to define custom message types and custom message display styles.

6. The system of claim 5, the message type of the message comprising a custom message type.

7. The system of claim 5, the syntax of the message comprising a custom keyword that represents the custom message type.

8. The system of claim 5, the message display style to specify a custom image and a custom command for the custom message type.

9. The system of claim 1, the message display component operative to display the message as a post on a blog.

10. A computer-implemented method of managing a social networking feed, comprising:
    receiving a message from a client device;
    defining a keyword that represents a custom message type;
    determining a message type of the message based on a syntax of the message, wherein a message type is associated with a specific message display style comprising at least one of a presentation parameter and a formatting parameter, the message type comprising the custom message type and the syntax comprising the keyword;
    retrieve a message display style associated with the message type; and
    display the message with the message display style specific to the message type of the message.

11. The method of claim 10, the syntax of the message comprising invisible metadata that represents the message type.

12. The method of claim 10, the message display style to specify a visual rendering and one or more commands.

13. The method of claim 10, comprising defining a custom message type and a custom keyword that represents the custom message type.

14. The method of claim 13, the message type of the message comprising the custom message type and the syntax of the message comprising the custom keyword.

15. The method of claim 13, comprising specifying a custom image and a custom command for the custom message type.

16. An article of manufacture comprising a data storage memory containing instructions that when executed cause a system to:
    receive a message from a client;
    determine a message type of the message based on a syntax of the message, wherein a message type is associated with a specific message display style comprising at least one of a presentation parameter and a formatting parameter, the syntax of the message comprising a custom keyword that represents the message type; and
    render the message with a message display style specific to the message type of the message.

17. The article of claim 16, the syntax of the message comprising a keyword that represents the message type.

18. The article of claim 16, the message comprising a message reply and the message display style for the message reply to specify a visual rendering and one or more commands.

19. The article of claim 16, further comprising instructions that when executed cause the system to define a custom message type and a custom keyword that represents the custom message type.

20. The article of claim 19, further comprising instructions that when executed cause the system to specify a custom image and a custom command for the custom message type.

* * * * *